United States Patent
Abraham et al.

(10) Patent No.: US 8,917,972 B2
(45) Date of Patent: *Dec. 23, 2014

(54) MODIFYING AUDIO IN AN INTERACTIVE VIDEO USING RFID TAGS

(75) Inventors: Subil M. Abraham, Plano, TX (US); Vinod A. Bijlani, Aundh (IN); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/618,485

(22) Filed: Sep. 14, 2012

(65) Prior Publication Data

US 2013/0011111 A1    Jan. 10, 2013

Related U.S. Application Data

(63) Continuation-in-part of application No. 11/860,185, filed on Sep. 24, 2007, now Pat. No. 8,339,458.

(51) Int. Cl.
*H04N 5/765* (2006.01)
*H04N 21/435* (2011.01)
(Continued)

(52) U.S. Cl.
CPC ............ *H04L 65/601* (2013.01); *H04N 21/435* (2013.01); *H04N 21/4341* (2013.01); *H04N 21/233* (2013.01); *H04N 21/8106* (2013.01); *H04N 21/235* (2013.01); *H04N 21/4316* (2013.01); *H04N 21/4852* (2013.01); *H04S 2400/15* (2013.01); *H04N 21/439* (2013.01); *H04W 4/008* (2013.01); *H04N 21/8133* (2013.01); *H04L 65/602* (2013.01); *H04R 2227/003* (2013.01); *H04R 27/00* (2013.01); *H04R 2227/009* (2013.01); *G11B 2020/10574* (2013.01); *H04L 65/607* (2013.01); *G10H 1/368* (2013.01); *G11B 27/034* (2013.01); *G11B 27/105* (2013.01); *H04N 21/8113* (2013.01); *G10H 2240/091* (2013.01); *H04S 7/30* (2013.01); *H04S 2400/13* (2013.01); *G10H 1/0083* (2013.01); *G10H 1/0555* (2013.01); *H04N 21/2368* (2013.01); *G10H 1/0008* (2013.01); *G10H 2240/115* (2013.01)
USPC ............................ 386/200; 386/239; 348/169

(58) Field of Classification Search
USPC .................................. 386/200, 239, E05.002
See application file for complete search history.

(56) References Cited

U.S. PATENT DOCUMENTS 5,953,485 A    9/1999  Abecassis
7,295,116 B2  11/2007  Kumar et al.
(Continued)

FOREIGN PATENT DOCUMENTS

KR   2006-0092829 A    8/2006
KR   2007-0047192 A    5/2007

OTHER PUBLICATIONS

Information Materials for IDS, Dated Apr. 30, 2012.

*Primary Examiner* — Thai Tran
*Assistant Examiner* — Girumsew Wendmagegn
(74) *Attorney, Agent, or Firm* — Patents on Demand P.A.; Brian K. Buchhelt; Scott M. Garrett

(57) ABSTRACT

Video and audio of a capture area is recorded. The capture area includes a sound-producing element that is to appear within a video. A radio-frequency identification (RFID) tag is attached to the sound-producing element. The RFID tag is scanned to automatically track the sound producing element relative to a position in the capture area. Configurable audio associated with the sound-producing element is embedded within the video.

24 Claims, 6 Drawing Sheets

(51) Int. Cl.

| | | |
|---|---|---|
| *H04N 21/434* | (2011.01) | |
| *H04N 21/233* | (2011.01) | |
| *H04N 21/81* | (2011.01) | |
| *H04N 21/235* | (2011.01) | |
| *H04N 21/431* | (2011.01) | |
| *H04N 21/485* | (2011.01) | |
| *H04N 21/439* | (2011.01) | |
| *H04W 4/00* | (2009.01) | |
| *H04L 29/06* | (2006.01) | |
| *H04R 27/00* | (2006.01) | |
| *G10H 1/36* | (2006.01) | |
| *G11B 27/034* | (2006.01) | |
| *G11B 27/10* | (2006.01) | |
| *H04S 7/00* | (2006.01) | |
| *G10H 1/00* | (2006.01) | |
| *G10H 1/055* | (2006.01) | |
| *H04N 21/2368* | (2011.01) | |
| *G11B 20/10* | (2006.01) | |

(56) References Cited

U.S. PATENT DOCUMENTS

| | | | |
|---|---|---|---|
| 7,512,886 B1 | 3/2009 | Herberger et al. | |
| 7,912,566 B2 | 3/2011 | Lee et al. | |
| 7,920,158 B1 | 4/2011 | Beck et al. | |
| 8,036,703 B2 | 10/2011 | Baker et al. | |
| 8,339,458 B2 * | 12/2012 | Abraham et al. | 348/169 |
| 2004/0105006 A1 | 6/2004 | Laso et al. | |
| 2005/0062844 A1 * | 3/2005 | Ferren et al. | 348/14.08 |
| 2006/0015348 A1 | 1/2006 | Cooper et al. | |
| 2006/0028552 A1 | 2/2006 | Aggarwal et al. | |
| 2006/0129458 A1 | 6/2006 | Maggio | |
| 2006/0233055 A1 | 10/2006 | Hendrickson et al. | |
| 2006/0259862 A1 * | 11/2006 | Adams et al. | 715/716 |
| 2006/0261938 A1 | 11/2006 | Lai et al. | |
| 2007/0044137 A1 | 2/2007 | Bennett | |
| 2007/0075139 A1 | 4/2007 | Hammond et al. | |
| 2008/0235741 A1 | 9/2008 | Ljolje et al. | |
| 2008/0246590 A1 | 10/2008 | Lee | |

* cited by examiner

MODIFYING AUDIO IN AN INTERACTIVE VIDEO USING RFID TAGS

CROSS-REFERENCE TO RELATED APPLICATIONS

This application is a continuation in part of U.S. patent application Ser. No. 11/860,185, filed Sep. 24, 2007 (pending), which is incorporated herein in its entirety.

BACKGROUND

The present invention relates to the field of video production, RFID tags, and audio.

The medium of video encompasses the presentation of audio information in addition to visual cues. Speech, music, and a variety of sound effects enhance the user experience of watching a video recording. The quality of the audio portion of a video often depends on a variety of factors, such as the recording environment and post-production processing. For example, recording an interview in an environment with a high level of ambient noise, such as at a busy street corner, can decrease the clarity of the recorded speech.

When listening to the audio of a video recording, consumers are typically able to only control the overall volume of the audio portion. That is, increasing the volume of the interview on the street corner in an attempt to better hear the speech also increases the volume level of the recorded ambient noise. Thus, the consumer is left with the same unclear audio situation, only louder.

Independent control of the various audio channels that make up the audio track of a video is currently reserved for those who perform production tasks, such as digital re-mastering. The equipment necessary to perform such modifications is not targeted to the average consumer in a user-friendly format.

BRIEF SUMMARY

In one embodiment of the disclosure, video and audio of a capture area is recorded. The capture area including a sound-producing element that is to appear within a video. A radio-frequency identification (RFID) tag is attached to the sound-producing element. The RFID tag is scanned to automatically track the sound producing element relative to a position in the capture area. Configurable audio associated with the sound-producing element is embedded within the video.

One embodiment of the disclosure includes a video capture system, an audio capture system, an RFID scanning system, and a configurable audio producing component. The video capture system records video produced in the capture area including the one or more sound-producing elements. The audio capture system records audio produced by one or more sound-producing elements in a capture area. The RFID scanning system scans RFID tags located within the capture area. The RFID tags are associated with each sound-producing element appearing in the capture area and to receive audio characteristics information or device information pertaining to the respective sound producing element from the RFID tags. The configurable audio producing component produces configurable audio information for the sound producing elements using location information obtained using the RFID tags and using the audio characteristic information or device information from the RFID tags. The configurable audio permits end-users to modify audio characteristics of one or more sound producing elements during playback of the video.

One embodiment of the disclosure includes a video playing system, which includes a display, an audio transducer, and an input mechanism. The display visually presents video, which include a plurality of distinct sound producing elements. The audio transducer audibly presents sound for the video. The input mechanism permits a user to select sound producing elements of the video. The input mechanism also includes an audio adjustment mechanism that permits a user to adjust a sound characteristic specific to the sound producing element without adjusting any other sound characteristic of the video.

DETAILED DESCRIPTION

Figure 1:
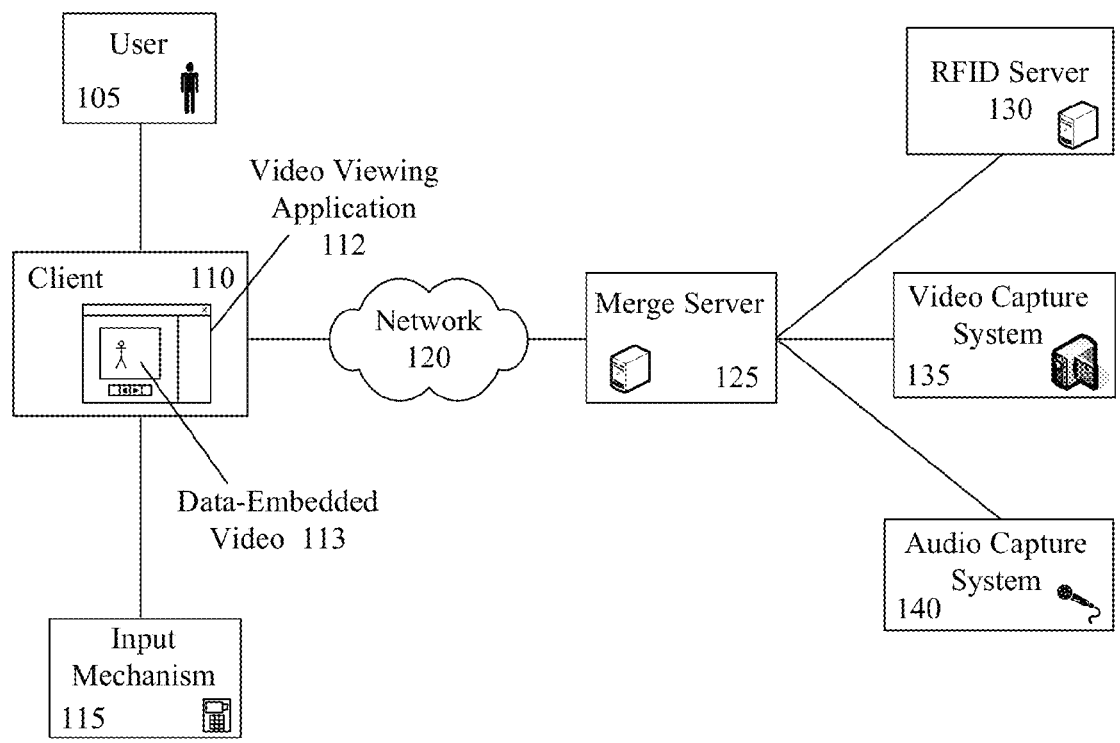
FIG. 1 is a schematic diagram illustrating a system for embedding audio characteristics produced by sound elements associated with RFID tags into a video in accordance with embodiments of the inventive arrangements disclosed herein.

The present invention discloses a solution for allowing the modification of audio characteristics for sound-producing elements appearing within a viewing region of a data-embedded video. For example, allowing a user to adjust the volume of a piano in a concert video without altering the volume levels of any of the other instruments or sound-producing elements, such as a singer. This can be achieved by embedding configurable audio characteristics in the video using Radio Frequency Identification (RFID) tags to associate a specific audio channel with the audio output of a specific sound-producing element.

A sound producing-element can represent any of a variety of physical objects, which appear within a video. For example, a piano can be a sound producing element, as can an actor, as can a vehicle. In one embodiment, the sound producing-element can be a "placeholder" for a significant component for sound within a scene, which is not necessarily associated with a visual agent. For example, a music soundtrack in the background can be a significant component to a movie's sound, but likely will not have an in-scene object associated with it. In such an instance, a placeholder, icon, selector, or other designator can be shown on a display for modifying or permitting a user to configure audio for this element. For example, a "background" icon can be presented to sound-adjust music background. In one embodiment, an icon or other selectable identifier can be presented without a GUI or other visual display) for a laugh-track—to adjust audio characteristics associated with the laugh track. Further, icon's or inserted selection mechanism can be selectively presented depending on a mode. For instance, a sound adjustment mode can cause indicators for all configurable sound producing elements to be visually displayed, highlighted, or otherwise emphasized—where in absence of the sound adjustment mode being disabled no such elements are displayed.

A user can make such modifications using input mechanisms normally associated with the video viewing device. For example, when the video is viewed on a television, a remote control can be used to adjust the audio characteristics. When the video is viewed on a computer, sound-producing elements can be selected by pointing to them with an on-screen pointer, which can result in the presentation of configurable options to the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for embedding audio characteristics produced by sound elements associated with RFID tags into a video in accordance with embodiments of the inventive arrangements disclosed herein. System 100 can include a client 110 configured to present a data-embedded video 113 within a viewing application 112 to a user 105. Client 110 can represent a variety of devices including, but not limited to, a personal computer, a television, a media player, or any other media viewing device or set of devices that are capable of presenting video, such as data-embedded video 113.

The data-embedded video 113 can be transmitted to the client 110 over a network 120 from a merge server 125. In another contemplated embodiment, an intermediary server or device (not shown) can exist between the merge server 125 and the network 120 in order to store the data-embedded video 113 for transmission. For example, a Video on Demand data store can store video from the merge server 125 for display upon a television (client 110). In another example, a personal video recorder connected to client 110 can store video obtained from server 125 for playback at a time convenient for user 105.

Regardless of whether the video is streamed over network 120 to client 110 or cached in a recording device and then presented upon client 110, the user 105 can interact with the elements in the data-embedded video 113. Interactions can be through an input mechanism 115 associated with the client 110. For example, when the client is a television, the input mechanism 115 can be a remote control or an input pad on the television itself. When the client 110 is a computer, the input mechanism 115 can be a mouse, a keyboard, or other such peripheral device.

In one embodiment, different modes can exist for the viewing application 112. One of these modes can present icons, buttons, or other visual selectors for those sound producing elements in the video, which are able to be user configured. When this mode is disabled, no such modifications may be possible. In one contemplated embodiment, objects appearing within the video can be touched (assuming a touch-screen display) or otherwise selected, which initiates permitting user adjustments on the audio specifically associated with the selected sound-producing element.

The video viewing application 112 can be constructed so that it is able to run on the client 110 and accept input from input mechanism 115. The application 112 can be implemented in software, hardware, or firmware. It can also be executed from within client 110 or be executed in an external device or module linked to client 110. For example, the video viewing application 112 can be a software application or browser plug-in in which the video 113 is displayed upon a computing device (client 110). In another example, the application 112 can be included within firmware of a set-top box which interfaces with a television (client 110). Further, viewing application 112 can include locally executing instructions, remotely executing instructions, and combinations thereof. In one embodiment, the video viewing application 112 can enable the user 105 to perform digital signal processing operations against user selected elements. For example, a user 105 can select a musical instrument associated with instrument specific audio and can alter sound characteristics of the instrument using editing options included as part of the application 112.

The merge server 125 can be a computing server that includes computer software and algorithms to create a data-embedded video 113. The software and algorithms of the merge server 125 can embed the information received from the RFID server 130 and audio capture system 140 into the video received from the video capture system 135, resulting in a data-embedded video 113. The merge server 125 can receive the data from the video capture system 135, the audio capture system 140, and RFID server 130 in real-time or can be provided prerecorded data for a delayed merge. In another embodiment, the merge server 125 can include a data store (not shown) to store received data to merge later.

The merge server 125 can utilize any of a variety of audio and video processing technologies to synchronize the RFID sensor 130 information, the audio of system 140, and the video of system 135. The exact technology utilized for this synchronization is not central to the solution of system 100, and system 100 is not to be construed as limited in this regard.

The video capture system 135 can include a multitude of components for video production, such as cameras, lights, computing devices and their software, and the like. The components of the video capture system 135 can utilize a variety of and intermixing of technologies, such as analog and digital recording devices. Additionally, the raw video created by the video capture system 135 can be further processed before being sent to the merge server 125. For example, the raw video recording of a television sitcom can be edited and refined prior to being sent to the merge server 125 to have data embedded within it.

The audio capture system 140 can include a multitude of components for the capture and processing of audio signals, such as microphones, amplifiers, mixers, and the like. The raw audio created by the capture system 140 can be processed prior to being conveyed to the merge server 125. For example, background noise can be eliminated from the audio track of a speaker before being embedded in the corresponding video.

Network 120 can include any hardware/software/and firmware necessary to convey data encoded within carrier waves. Data can be contained within analog or digital signals and conveyed though data or voice channels. Network 120 can include local components and data pathways necessary for communications to be exchanged among computing device components and between integrated device components and peripheral devices. Network 120 can also include network equipment, such as routers, data lines, hubs, and intermediary servers which together form a data network, such as the Internet. Network 120 can also include circuit-based communication components and mobile communication components, such as telephony switches, modems, cellular communication towers, and the like. Network 120 can include line based and/or wireless communication pathways.

Figure 2:
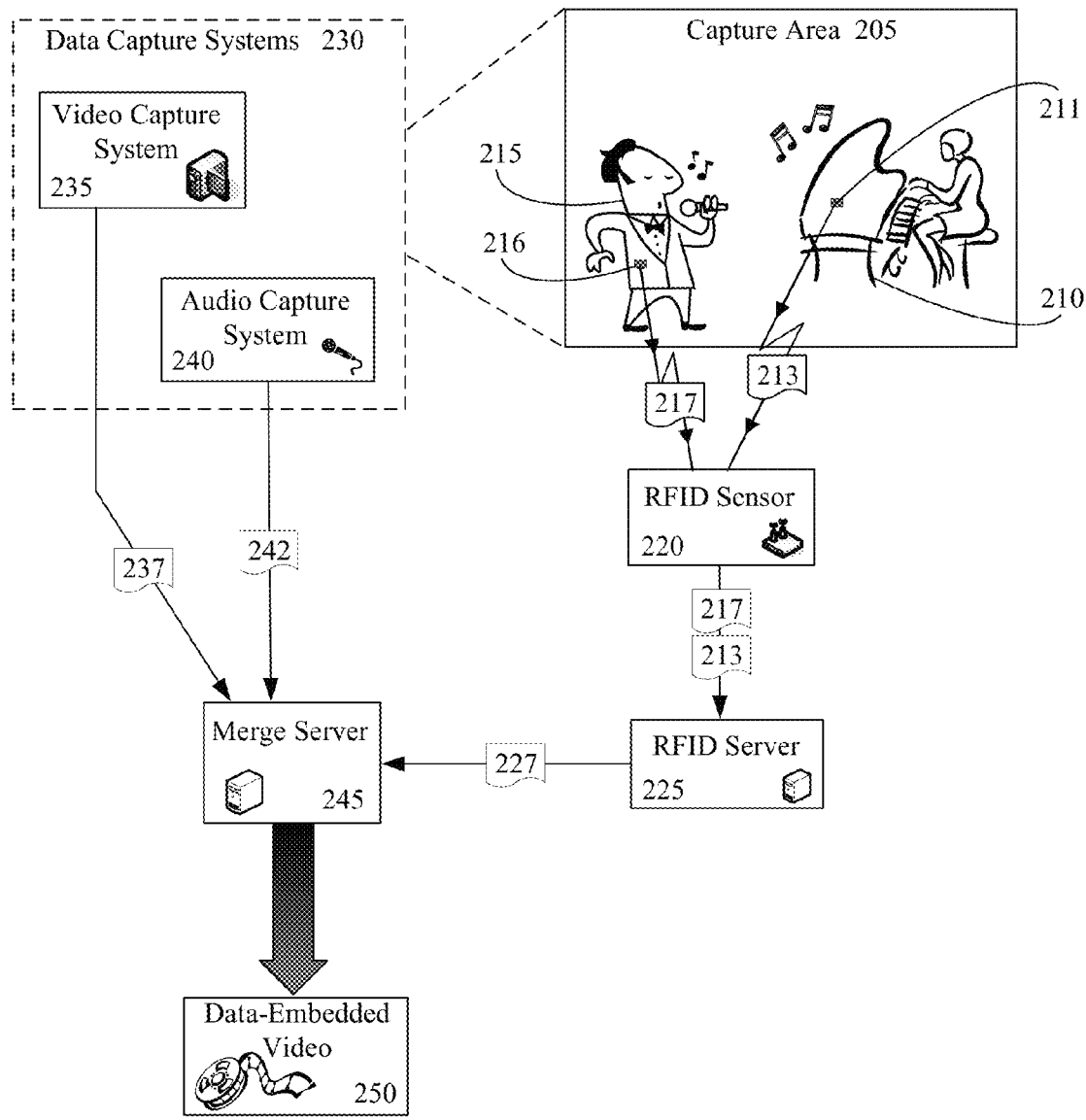
FIG. 2 is a schematic diagram illustrating a system that captures audio characteristics produced by sound elements associated with RFID tags into a video in accordance with embodiments of the inventive arrangements disclosed herein.

FIG. 2 is a schematic diagram illustrating a system 200 that captures audio characteristics produced by sound elements associated with RFID tags into a video in accordance with embodiments of the inventive arrangements disclosed herein. System 200 can be an extension to system 100. System 200 is not limited in this regard, however, and can be performed in the context of any system supporting the use of RFID tags for capturing audio characteristics to embed within a video.

In system 200, data capture systems 230 can be set up to capture data in the capture area 205. The data capture systems 230 can include a video capture system 235 and an audio capture system 240. The video capture system 235 can utilize a variety of components by which to produce a visual recording of the capture area 205, resulting in a corresponding viewing region for the generated video 237. The video capture system 235 can do so through a variety of means, including, but not limited to, camera-controlling software, manual operation, and the like. The video 237 produced by the video capture system 235 can be conveyed to the merge server 245 for data embedding.

The audio capture system 240 can utilize a variety of components by which to produce an audio recording of the capture area 205 that corresponds to the video recording of the capture area 205. The audio capture system 240 can do so through a variety of means, including, but not limited to, stationary microphones, wireless microphones, directional microphones, and the like. The audio track 242 produced by the audio capture system 240 can be conveyed to the merge server 245 for data embedding.

The capture area 205 can contain one or more sound-producing elements 210 and 215. As used herein, a sound-producing element is defined as one or more items designated as producing a specific audio stream. For example, each speaker in an interview can be designated as a sound-producing element so that their corresponding audio streams can be independently controlled. Alternately, all other noises, such as street noise should the interview be conducted outside, can be grouped together as background noise.

The sound-producing elements 210 and 215 can be placed within the capture area 205 so that their appearance and sound can be recorded. Additionally, the sound-producing elements 210 and 215 can contain RFID tags containing audio characteristics pertaining to the specific sound-producing elements. In this example, RFID tag 211 contains the audio characteristics specific to the piano and is attached to the piano; RFID tag 216 contains the audio characteristics specific to the singer and is attached to the singer. It should be appreciated that the RFID tags 211 and 216 can be attached to the sound-producing elements 210 and 215 in a variety of ways that are independent to the functionality of the overall system 200. Additionally, a RFID tag can be associated with a set of sound-producing elements, such as elements that together produce ambient audio. Thus, the RFID tag can represent a focal point for capturing/producing ambient or grouped sound, where the focal point can dynamically change as the RFID moves within the capture area 205.

The RFID sensor 220 can detect the signals of the RFID tags 211 and 216 of the sound-producing elements 210 and 215, respectively. Additionally, the RFID sensor 220 can receive data contained within the RFID tags 211 and 216. In this example, the RFID sensor 225 receives data item 213 from RFID tag 211 and data item 217 from RFID tag 216. The data items 213 and 217 can include product information, such as item details, audio characteristics, such as tone. A location of the tag within the video capture area 205 can be automatically determined by triangulating a position of the RFID tag based upon input from a plurality of RFID sensors 220.

The RFID sensor 220 can pass the data items 213 and 217 to the RFID server 225. The RFID server 225 can merge the locations and associated information for all tags for a specified time reference. This can be achieved by creating a grid mapping 227 of the location of tags with their associated information for the specified time reference. The grid mapping 227 can then be passed to the merge server 245 for synchronization with the video 237 and audio 242.

Upon receipt of the video 237 from the video capture system 235, the audio track 242 from the audio capture system 240, and the RFID location and data grid mapping 227, the merge server 245 can begin embedding the information within the video. For a specified time reference, the received grid mapping 227 can have the video 237 and audio 242 for the corresponding time reference overlaid upon it, thereby resulting in the data-embedded video 250.

Figure 3:
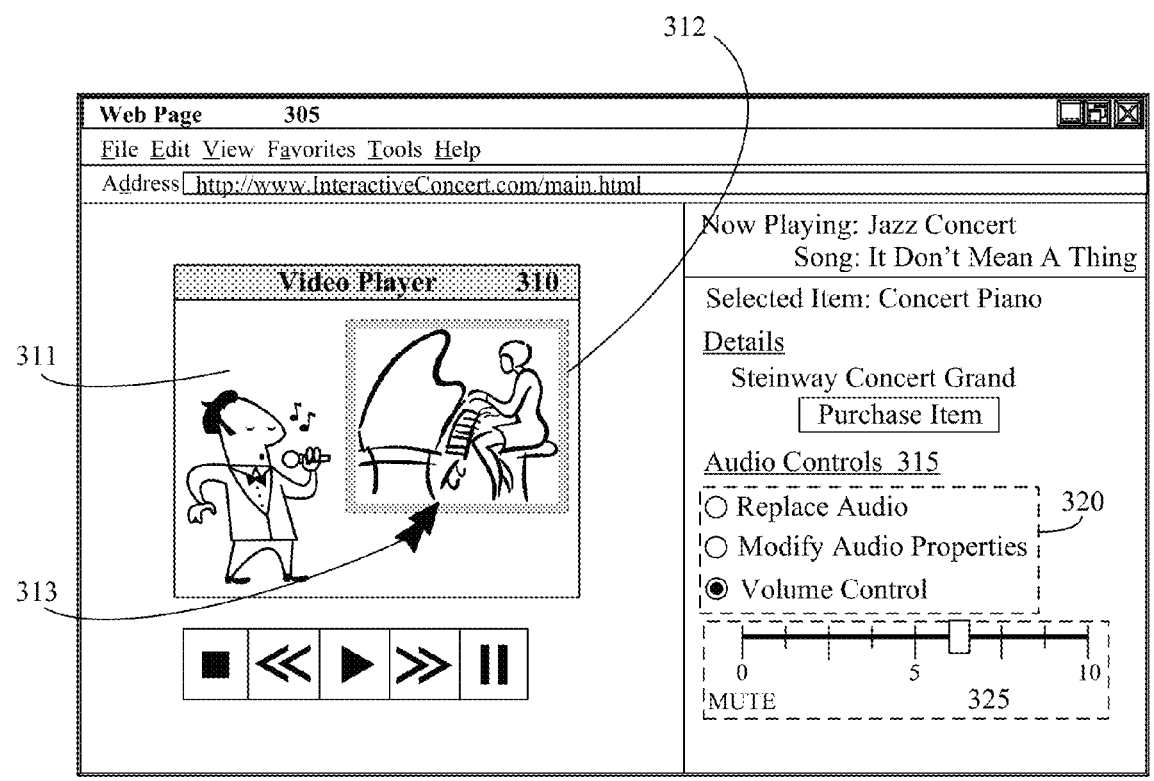
FIG. 3 is an illustration of a Web page for user interaction with a video embedded with modifiable audio characteristics in accordance with an embodiment of the inventive arrangements disclosed herein.

FIG. 3 is an illustration of a Web page 305 for user interaction with a video embedded with modifiable audio characteristics in accordance with an embodiment of the inventive arrangements disclosed herein. Web page 305 can be a means by which a user can interact with a data-embedded video, such as the data-embedded video 250 created by system 200. Any client-side application and/or interface able to interact with remote content can be substituted for the Web page 305, yet still be considered within the scope of the disclosed solution. For example, instead of a Web page 305, the interface of FIG. 3 can be implemented as a Rich Internet Application or a Rich Client Application.

In FIG. 3, a user can view the data-embedded video 311 in a video player 310 contained within the Web page 305 (or other interactive interface). The data-embedded video 311 can include a data indicator 312 to alert a user that a sound-producing element in the video 311 has modifiable audio characteristics. In this example, the data indicator 312 is visual and represented by a colored border around the element. The data indicator 312 can also be implemented in a variety of other manners, including, but not limited to, an audio alert, a pop-up window, a fly-over window, and the like. Additionally, the data indicator 312 can include a combination of multiple methods, such as a specific audio alert coupled with a change in color around the product item.

A user can elect to select the indicated sound-producing element with a selector 313. This selector 313 can have a visual representation, such as the arrow shown in the example. Additionally, the selector 313 can trigger a data indicator 312 when placed over a sound-producing element that has modifiable audio characteristics.

The selection of a sound-producing element with embedded modifiable audio characteristics can display the audio controls 315 within a section of the Web page 305. Alternately, the section of the Web page 305 displaying the audio controls 315 can appear external to the Web page 305, such as in a pop-up or fly-over window or a separate Web page.

The audio controls 315 can include a set of options 320 by which a user can select audio characteristics for modification. Selection of a specific option 320 can result in the presentation of an associated control mechanism 325 for the audio characteristic. The presentation of a control mechanism 325 can be accomplished in a variety of manners, including, but not limited to, utilizing space in the Web page 305, an external Web page, a pop-up window, a fly-over window, and the like. As shown in this example, the volume control option is selected and so a volume control mechanism 325, a slider bar, is displayed to the user in the Web page 305. The selectors 320 and control mechanisms 325 can be implemented in any manner compatible with the technology of the overall system and Web site.

A modification to the specified audio characteristic can be made within the control mechanism 325. Such a modification results in a corresponding audible change in the audio of the selected element. For example, a user can opt to slide the slider of the volume control slider bar 325 to zero ('0') to mute the piano music, resulting in the user only hearing the vocal portion.

It should be noted that the modification of the audio characteristics of one sound-producing element does not influence the audio characteristics of another sound-producing element within the same video scene. As in the above example, changing the volume of the piano does not change the volume at which the vocal portion is played.

It should be appreciated that modifications of audio characteristics are not limited to volume, but can include any audio characteristic modification able to be performed using digital signal processing operations. For example, a guitar fitted with steel strings can be present in the video player 310 interface and can have modifiable audio characteristics. One of the characteristics can substitute different types of strings for the guitar, which results in different audio characteristics. For example, a user can be provided an option to replace the steel strings with nylon strings. The original audio melody can then be replayed, except the sound produced by the guitar is a simulated sound of that guitar having nylon strings. This concept of modifying audio characteristics can extend to other audio areas, such as changing a tempo, a pitch interval, etc. of an instrument.

In another example, the audio controls 315 can grant an ability to duplicate audio produced by one or more selected sound producing objects, where the duplicated audio has different time lags associated with the selected sound producing objects than an original audio. For instance, a user watching an orchestra perform may feel that duplicating an instrument's sound and adding some time-lag to it may improve the overall quality and effect of the entire musical piece, thus enriching his/her viewing experience.

Audio modifications are not limited to instruments. For example, speech characteristics of selected actors can similarly be modified to simulate different pitch, speaking rates, accents, languages (e.g., which in one embodiment can be dynamically translated from an original to a user selected language), a head-size, pitch, gender, and the like. Generally, the solution described herein permits any type of user specifiable digital signal processing to be performed against discrete audio sources to change an audio output generated from that audio source.

Further, when extensive modifications of an audio source are anticipated, audio information associated with that audio source can be intentionally overloaded to ensure clear audio results from user selections. For example, a guitar being advertised within a video segment can be "overloaded" to include actual music tracks produced by different variations of the guitar (e.g., steel strings versus nylon strings). Thus, selecting different audio properties 320 for the guitar can result in actual as opposed to simulated sounds from the guitar. Additionally, different actor specific audio tracks can be included for different languages, which permit viewers to select a different language for one or more actors appearing within a video. Changing a language of one actor using interface 305 does not necessarily change a language spoken by other actors appearing within a scene.

Figure 4:
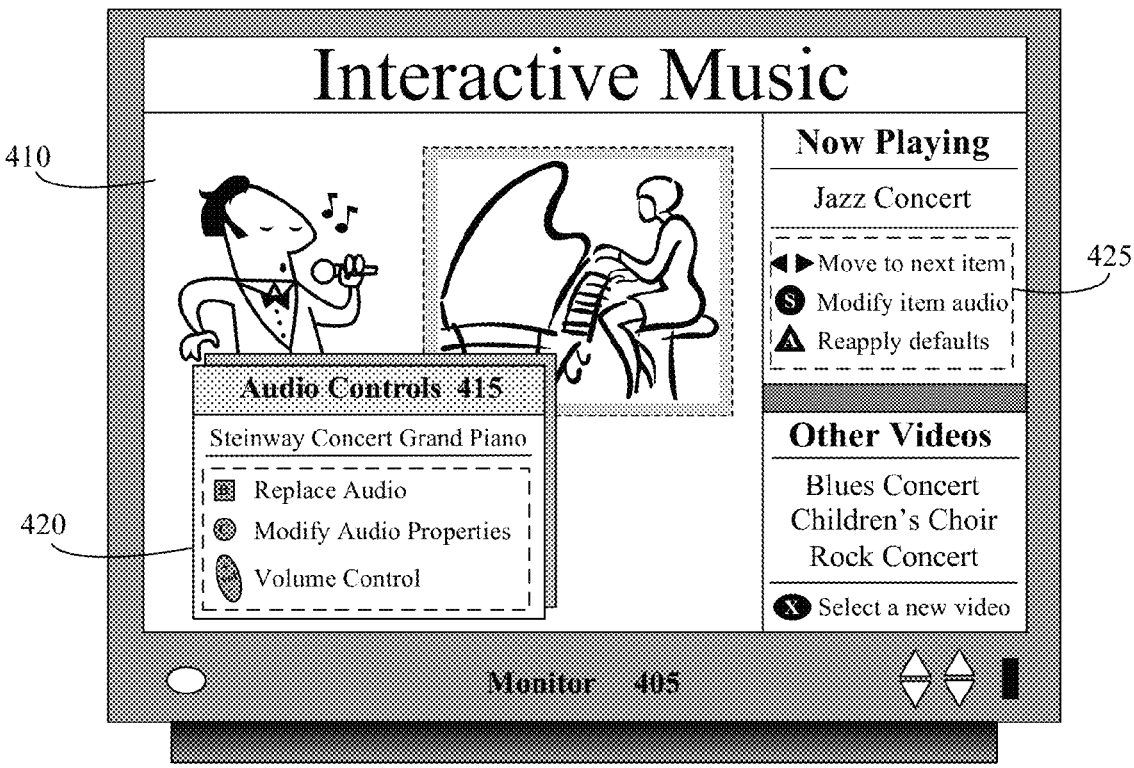
FIG. 4 is an illustration of a video monitor interface for user interaction with a video embedded with modifiable audio characteristics in accordance with an embodiment of the inventive arrangements disclosed herein.
Figure 4:
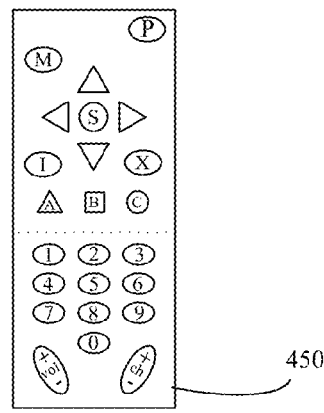

FIG. 4 is an illustration of a video monitor interface 400 for user interaction with a video embedded with modifiable audio characteristics in accordance with an embodiment of the inventive arrangements disclosed herein. This interface 400 can be a means by which a user can interact with a data-embedded video, such as the data-embedded video 250 created by system 200.

The monitor 405 can display video 410 within an environment that simulates the viewing application 112 of system 100. Alternately, the video 410 can be viewed on monitor 405 in the same manner as other programming, such as television programming, cable programming, satellite programming, ON-DEMAND movies, and the like.

A user can select of a sound-producing element within the video 410 that has modifiable audio characteristics with a remote control 450. Such a selection can trigger the display of the audio controls window 415. The audio controls window 415 can present the user with options 420 for the modifiable audio characteristics associated with the selected sound-producing element. This window 415 can remain visible for a set amount of time or until a user makes another selection.

Additional user-selectable controls 425 can be available to the user to provide general functionality. Both the audio options 420 and user-selectable controls 425 can correspond to buttons available on the remote control 450. In this example, the user-selectable controls 425 can allow a user to navigate through the sound-producing elements of the video 410, select a sound-producing element to modify, and reapply the default settings. It should be appreciated that the listed controls need to correspond to buttons available on the remote control 450 that is specifically associated with the monitor 405 or to buttons that are generally available on a variety of remote control models in order to ensure functionality.

Figure 5:
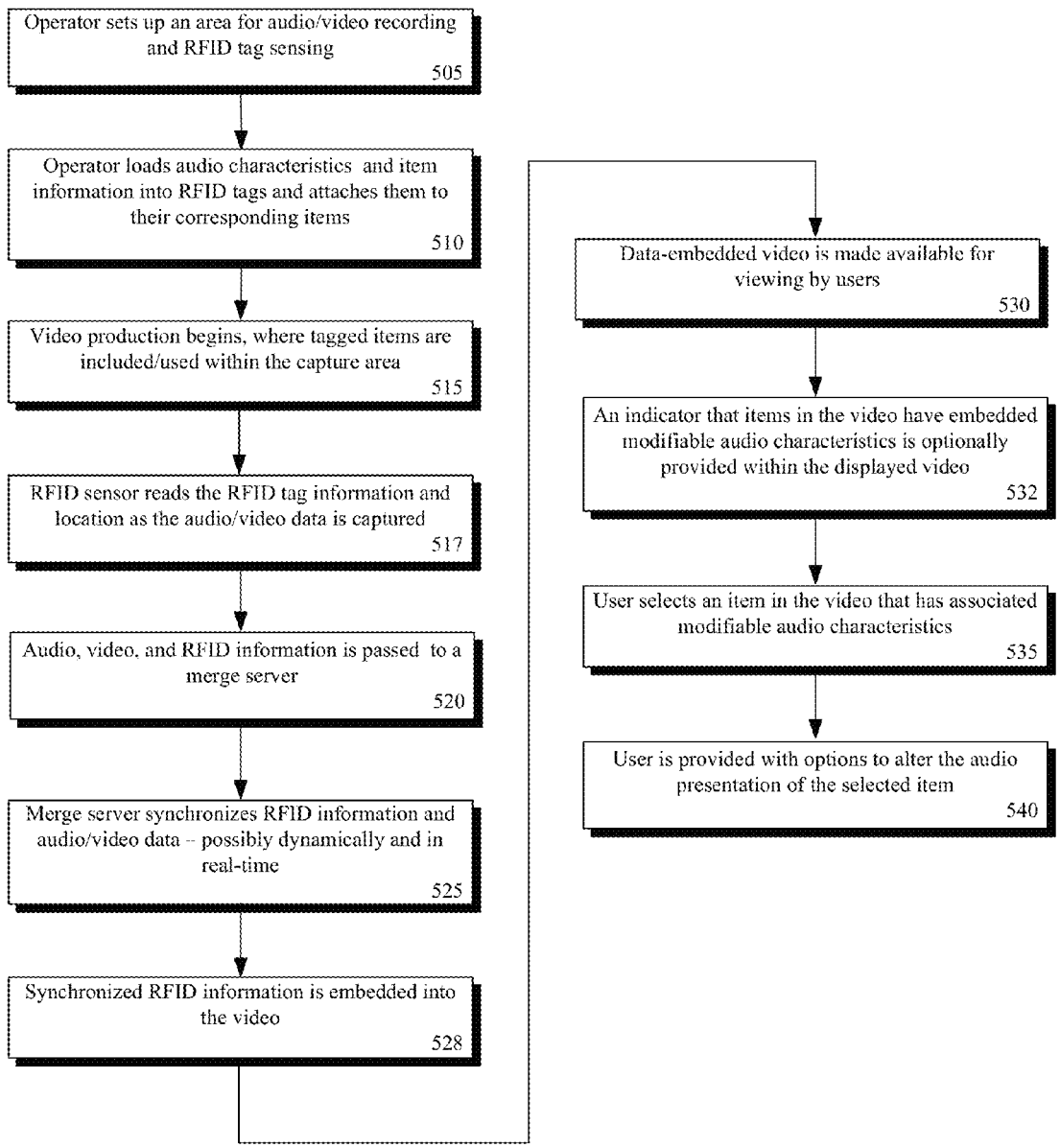
FIG. 5 is a flow chart of a method for capturing and embedding modifiable audio characteristics associated with a sound-producing element in a video in accordance with an embodiment of the inventive arrangements disclosed herein.

FIG. 5 is a flow chart of a method 500 for capturing and embedding modifiable audio characteristics associated with a sound-producing element in a video in accordance with an embodiment of the inventive arrangements disclosed herein. Method 500 can be performed in the context of systems 100 and/or 200. Additionally, method 500 can utilize interfaces 305 and/or 400.

Method 500 can begin in step 505 where an operator sets up an area for audio/video recording and the sensing of RFID tags. This step can include the installation and configuration of the video capture system 135 and audio capture system 140 of system 100 as well as the RFID sensor 220 and RFID server 225 of system 200.

In step 510, the operator can load the RFID tags with audio characteristics and item information and can attach the tags to their corresponding items. Then, video production can begin in step 515, where the tagged sound-producing elements are included and/or used in the capture area.

While the tagged items are being recorded, one or more RFID sensors can receive the loaded information from the tags as well as determine a location of each of the tags, as indicated by step 517. In step 520, the audio, video, and RFID information can be passed to a merge server. The loaded information can include audio characteristics information for the related sound producing element. In one embodiment, the loaded information can explicitly include thresholds, conditions, values, rules, and other useful information for digital signal processing of the element, which is used to produce configurable audio and configuration thresholds. In one embodiment, actual digital signal processing programs (or parameters to be ingested by a DSP program) can be loaded in the RFID tags or and used when producing configurable audio.

The merge server can synchronize the RFID information with the audio and video in step 525. It should be appreciated that step 525 can occur dynamically and in real-time in regard to the recording of the tagged items.

In step 528, the merge server can embed the synchronized RFID information into the video. The data-embedded video can be made available to users in step 530. Step 532 can optionally occur where an indicator is provided to alert users that an item has modifiable audio characteristics associated with it.

In step 535, a user can select an item in the video that has modifiable audio characteristics associated with it. In step 540, the user can be provided with options to alter the audio presentation of the selected item.

Figure 6:
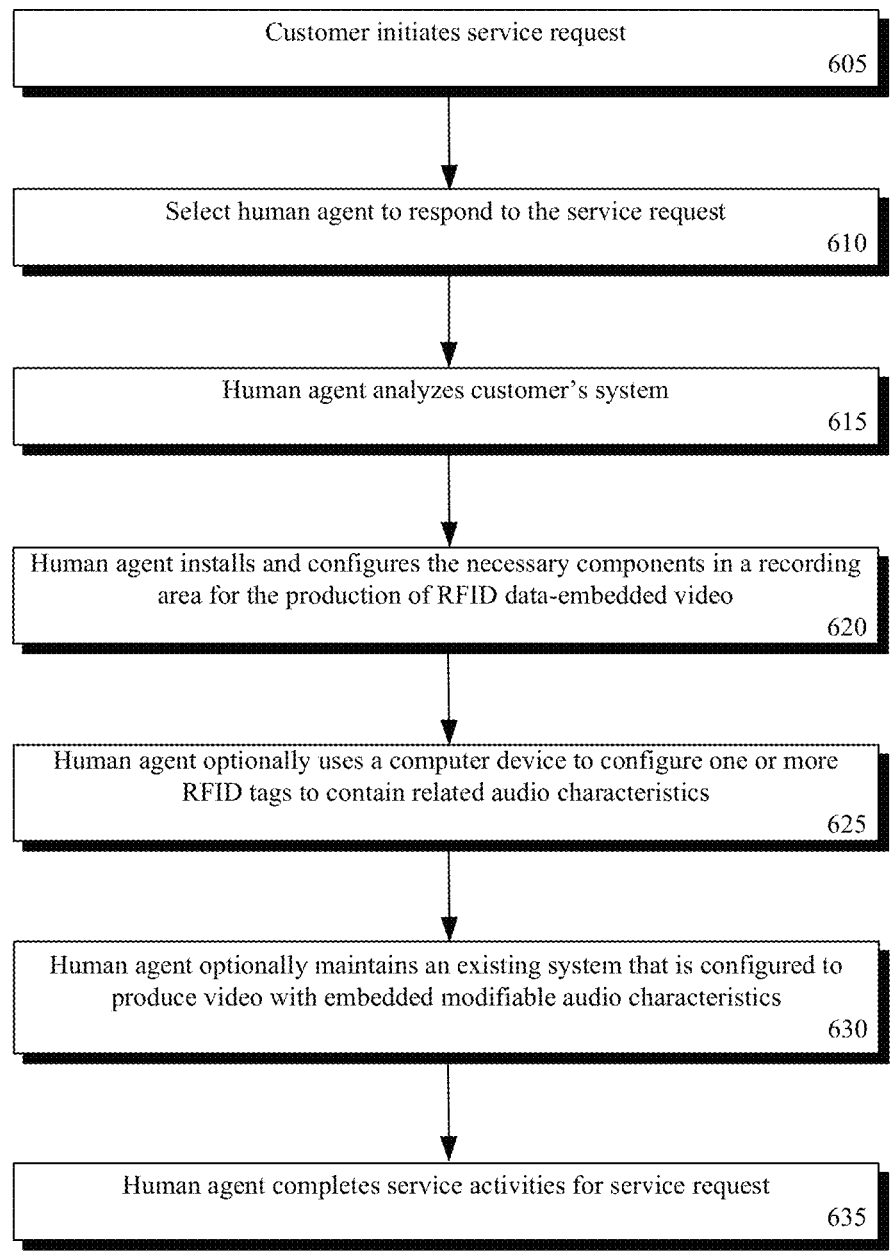
FIG. 6 is a flow chart of a method where a service agent can configure a video system to produce video with embedded modifiable audio characteristics in accordance with an embodiment of the inventive arrangements disclosed herein.

FIG. 6 is a flow chart of a method 600 where a service agent can configure a video system to produce video with embedded modifiable audio characteristics in accordance with an embodiment of the inventive arrangements disclosed herein. Method 600 can utilize system 100 and/or 200 as well as interfaces 305 and/or 400.

Method 600 can begin in step 605, when a customer initiates a service request. The service request can be a request for a service agent to establish a new system for embedding modifiable audio characteristics into a video. The service request can also be a request to troubleshoot a problem with an existing system for embedding modifiable audio characteristics into a video.

In step 610, a human agent can be selected to respond to the service request. In step 615, the human agent can analyze a customer's current system and can develop a solution. The solution can result in system 100 and/or 200, or any system configured to capture modifiable audio characteristics contained within a RFID tag on an object to embed within a video of that object, such as a system that performs the steps of method 500.

In step 620, the human agent can configure the customer's system to capture modifiable audio characteristics contained within a RFID tag on an object to embed within a video of that object. This can include the installation of a video capture system, an audio capture system, a RFID sensor, RFID server, and merge server. In step 625, the human agent can optionally use a computer device to configure one or more RFID tags to contain related audio characteristics.

In step 630, the human agent can optionally maintain an existing system that is configured to produce video with embedded modifiable audio characteristics for the customer. In step 635, the human agent can complete the service activities.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    at least one computing device recording video and audio of a capture area, said area including a sound-producing element that is to appear within a video, wherein a radio-frequency identification (RFID) tag is attached to sound producing element, wherein the RFID tag are loaded with audio characteristics information and device information pertaining to the respective sound-producing element;
    at least one computing device scanning the RFID tag to automatically track the sound producing element relative to a position in the capture area; and
    at least one computing device embedding configurable audio associated with the sound-producing element within the video.

2. The method of claim 1, further comprising:
    at least one computing device retrieving information loaded in the RFID tag; and
    at least one computing device processing the using the retrieved information to produce the configurable audio.

3. The method of claim 1, wherein an end-user is able to adjust an audio characteristic of each sound-producing element by configuring the embedding audio associated specifically with a corresponding sound-producing element without adjusting other audio elements of the video in a corresponding manner.

4. The method of claim 1, further comprising:
    configuring an audio capture system to record audio produced by the sound-producing element in the capture area, wherein the audio capture system records the audio; and
    configuring a video capture system to record video produced in the capture area including the one or more sound-producing elements, wherein said video capture system records the video.

5. The method of claim 1, wherein the scanning collects sensor information comprising audio characteristics information and device information loaded in the RFID tag.

6. The method of claim 5, further comprising;
    mapping the collected sensor information with the recorded audio to produce configurable audio for the video.

7. The method of claim 1, further comprising:
    at least one computing device automatically determines a physical location of the corresponding sound producing element relative to a position in the area using the RFID tag.

8. The method of claim 1, wherein the one or more audio characteristics include at least one of pitch, tone, quality, and volume.

9. The method of claim 1, wherein the one or more audio characteristics include pitch, tone, quality, or combinations of pitch tone and quality.

10. The method of claim 1, wherein the one or more audio characteristics includes relative volume of the sound producing element relative to other audio of the video.

11. The method of claim 1, wherein the video comprises a plurality of actors, wherein at least one of the actors is a sound producing element, wherein the end-user is able to select the actor and adjust a sound characteristic of the selected actor, said sound characteristic including a volume of the actor, wherein changing the volume of the actor does not change the volume of other non-selected actors and does not change other sound-producing elements appearing in the video.

12. A computer program product comprising:
    one or more computer-readable, non-transitory mediums;
    program instructions, stored on at least one of the one or more non-transitory storage mediums, to record video and audio of a capture area, said area including a sound-producing element that is to appear within a video, wherein a radio-frequency identification (RFID) tag is attached to the sound-producing element, wherein the RFID tag are loaded with audio characteristics information and device information pertaining to the respective sound-producing element;
    program instructions, stored on at least one of the one or more non-transitory storage mediums, to scan the RFID tag to automatically track the sound producing element relative to a position in the capture area; and program instructions, stored on at least one of the one or more non-transitory storage mediums, to embed the configurable audio associated with the sound-producing element within the video.

13. The computer program product of claim 12, wherein an end-user is able to selectively modify one or more audio characteristics of a specific one of the one or more sound-producing elements in the embedded video without producing a corresponding change in the audio characteristics of one other of the one or more sound-producing elements in the embedded video.

14. The computer program product of claim 12, wherein the program instructions to scan further collect sensor information comprising audio characteristics information and device information loaded in the RFID tag.

15. The computer program product of claim 14, further comprising;
program instructions, stored on at least one of the one or more non-transitory storage mediums, to map the collected sensor information with the recorded audio to produce configurable audio for the video.

16. A system comprising:
one or more processors;
one or more non-transitory storage mediums;
program instructions stored on the one or more non-transitory storage mediums, wherein the one or more processors execute the program instructions causing the system to:
record video and audio of a capture area, said area including a sound-producing element that is to appear within a video, wherein a radio-frequency identification (RFID) tag is attached to sound producing element, wherein the RFID tag are loaded with audio characteristics information and device information pertaining to the respective sound-producing element;
scan the RFID tag to automatically track the sound producing element relative to a position in the capture area; and
embed configurable audio associated with the sound-producing element within the video.

17. The system of claim 16, wherein the one or more processors executing the program instructions further cause the system to:
collect sensor information comprising audio characteristics information and device information loaded in the RFID tag.

18. The computer program product of claim 17, wherein the one or more processors executing the program instructions further cause the system to:
map the collected sensor information with the recorded audio to produce configurable audio for the video.

19. A method comprising:
at least one computing device recording video and audio of a capture area, said area including a sound-producing element that is to appear within a video, wherein a radio-frequency identification (RFID) tag is attached to sound producing element;
at least one computing device scanning the RFID tag to automatically track the sound producing element relative to a position in the capture area, wherein the scanning collects sensor information comprising audio characteristics information and device information loaded in the RFID tag; and
at least one computing device embedding configurable audio associated with the sound-producing element within the video.

20. The method of claim 19, further comprising:
at least one computing device retrieving information loaded in the RFID tag; and
at least one computing device processing the using the retrieved information to produce the configurable audio.

21. The method of claim 19, wherein an end-user is able to adjust an audio characteristic of each sound-producing element by configuring the embedding audio associated specifically with a corresponding sound-producing element without adjusting other audio elements of the video in a corresponding manner.

22. The method of claim 19, further comprising:
configuring an audio capture system to record audio produced by the sound-producing element in the capture area, wherein the audio capture system records the audio; and
configuring a video capture system to record video produced in the capture area including the one or more sound-producing elements, wherein said video capture system records the video.

23. The method of claim 19, further comprising:
at least one computing device automatically determines a physical location of the corresponding sound producing element relative to a position in the area using the RFID tag.

24. The method of claim 19, wherein the one or more audio characteristics include at least one of pitch, tone, quality, and volume.

* * * * *